Oct. 11, 1966 T. A. G. ROING 3,277,855
STRETCHABLE JOINT CONSTRUCTION
Filed Nov. 4, 1964 2 Sheets-Sheet 1

Inventor:
Ture Ake Gillis Roing
BY Baldwin & Wight
Attorneys

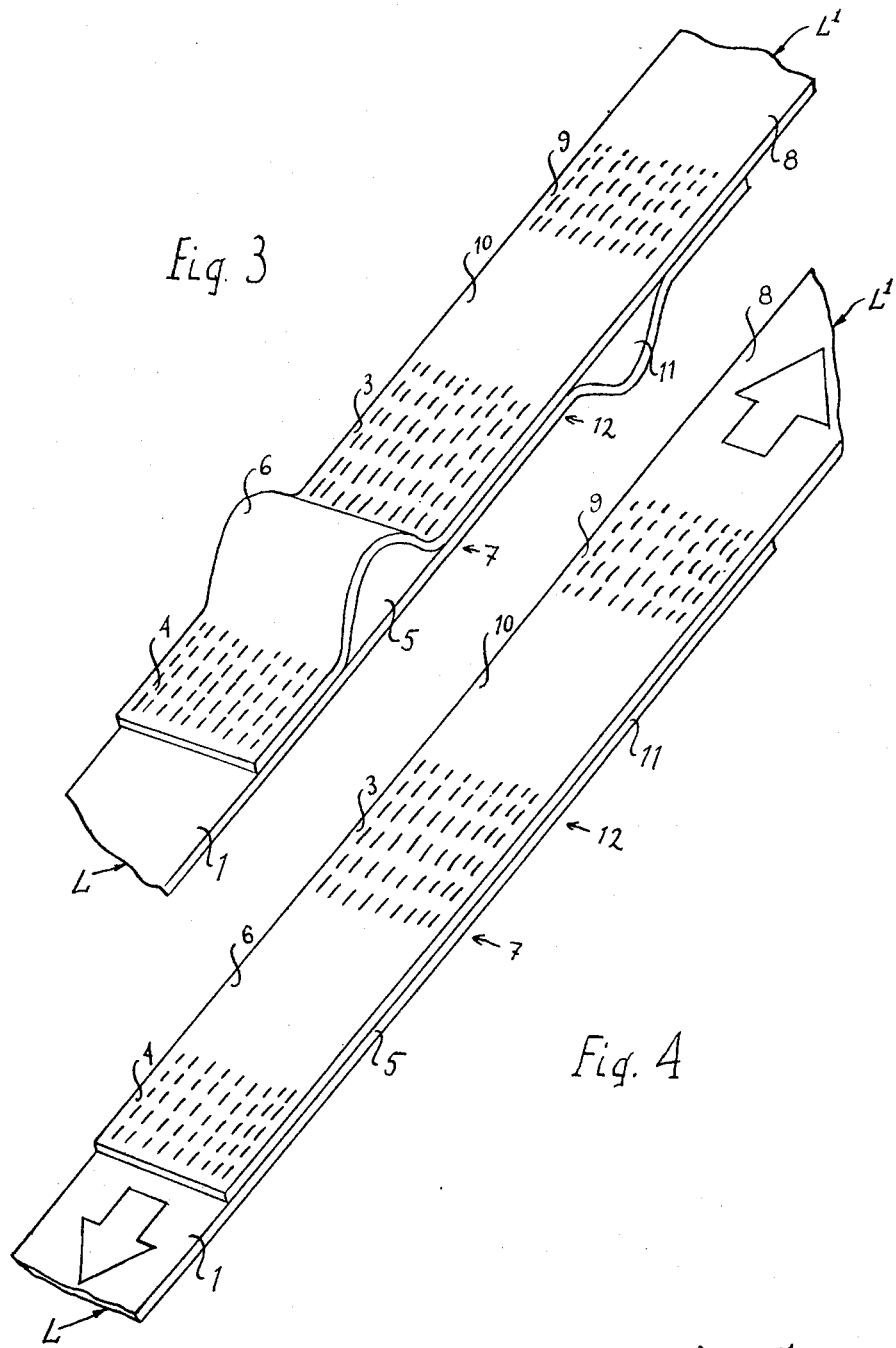

United States Patent Office 3,277,855
Patented Oct. 11, 1966

3,277,855
STRETCHABLE JOINT CONSTRUCTION
Ture Ake Gillis Roing, Malmo, Sweden, assignor to Aktiebolaget Textilkonst, Malmo, Sweden, a corporation of Sweden
Filed Nov. 4, 1964, Ser. No. 409,024
2 Claims. (Cl. 112—413)

A joint construction for elastic or stretchable webbing, strapping and like materials.

This invention relates to a construction of a joint for elastic or stretchable webbing, strapping or like ribbon material, which is such that the strength of the joint is stronger than with conventional constructions.

According to the present invention, in a construction of joint for elastic or stretchable webbing, strapping or like ribbon material the two portions to be joined are overlapped and secured together in a head joint and a supporting joint spaced longitudinally therefrom and are left free and unattached in an intermediate zone between said joints.

Preferably the portion of webbing or like material on the loading side of the joint construction is of shorter length between the head joint and the supporting joint than the overlapped portion of the webbing, whereby the other, i.e. overlapped portion of webbing or like material is looped as a bight. The dimension of the bight is chosen according to the elasticity, plasticity and strength of the material so that it is straightened out at a predetermined percentage of the breaking load of the material, thereby functioning as a protection against any overload.

The two portions of webbing or like material may be joined together at the head and supporting joints by sewing, glueing, welding or other suitable manner depending upon the material per se.

Figure 1:
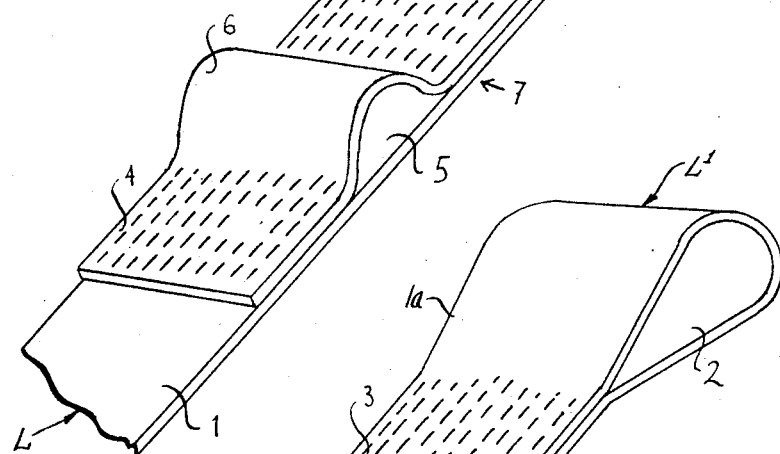
Figure 2:
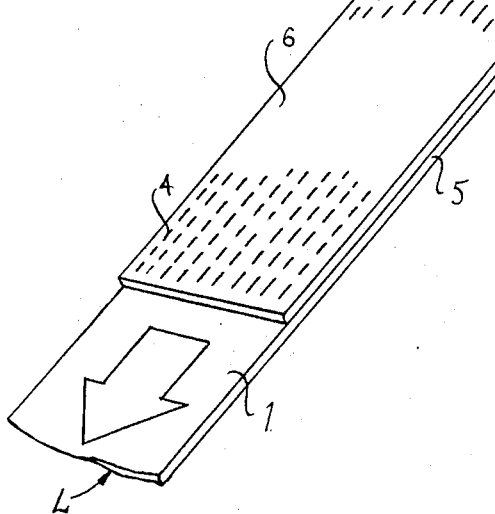

Examples of the invention are now described with reference to the accompanying drawings, in which FIG. 1 shows a seam, in position of repose, on a webbing with a loop; FIG. 2 shows the seam straightened out by load; FIG. 3 shows two webbing ends sewn together in position of repose; and FIG. 4 shows the sewn ends straightened out by load.

Referring to FIGURES 1 and 2 the webbing part 1 extends through a loop 2 and continues as a webbing part 1a held by a joint which is composed of a head seam 3 and a supporting seam 4. The webbing piece 5 or constituent part of the part 1 between the two seams 3 and 4 on the draw-side is shorter than the opposite webbing piece or constituent part 6 of the part 1a which, under no load conditions, forms a bight. The construction has spaced loading portions L and L¹ for application of force tending to stretch the webbing parts.

When the webbing is stretched by pulling, those stitches 7 in the head seam 3, which are closest to the supporting seam 4 will take the greatest strain, due to the elasticity or stretchability in the webbing.

When stretching, as is shown in FIG. 2, the longer intermediate part 6 will be straightened out, when the opposite part 5 is stretched to the same length. Hereby a part of the strain in the stitches by 7 will be transferred to the supporting seam 4, and bursts in the stitches at 7 do not appear. The increased strength in the seam aimed at is thereby reached.

Referring to FIGS. 3 and 4 the webbing end parts 1 and 8 are sewn together with a head seam 3 and the supporting seams 4 and 9. The webbing constituent parts 5 and 10 on the draw-side between the head seam 3 and the supporting seams 4 and 9 are shorter than the opposite webbing constituent parts 6 and 11.

When stretching, as is shown in FIG. 4, the longer webbing pieces 6 and 11 will be straightened out when the opposite webbing pieces 5 and 10 are stretched to the same lengths. Hereby a part of the strain in the outermost stitches in the head seam at 7 and 12 is transferred to the supporting seams 4 and 9, and bursts in the stitches at 7 and 12 do not appear.

The increased strength in the seam aimed at is thereby reached.

In both constructions, i.e. those illustrated respectively in FIGURES 1 and 2 and in FIGURES 3 and 4, application of initial tensile loading force to the loading portions L and L¹ places the constituent webbing parts 5 under tensile loading without loading the bights 6 and without loading the supporting joints 4. The bights and supporting joints are loaded only upon application of sufficient tensile loading to the loading portions L and L¹ to stretch the constituent parts 5 sufficiently to straighten the bights 6.

What is claimed is:
1. A webbing construction comprising two stretchable webbing parts overlapped one upon the other and respectively having spaced loading portions for application of force to said construction tending to stretch said parts under tensile loading; first means securing said parts together to provide a head joint which is between said loading portions and is spaced from both of said loading portions; second means securing said parts together to provide a supporting joint which is between said head joint and one of said loading portions and is spaced from both said head joint and said one of said loading portions, each of said webbing parts having a constituent part spanning the space between said head joint and said supporting joint and one of said constituent parts being longer than the other of said constituent parts so as to form a bight, application of an initial tensile loading force to said loading portions placing said other of said constituent parts and said head joint under tensile loading without loading said bight and without loading said supporting joint, said bight and said supporting joint being loaded only upon application of sufficient tensile loading to said loading portions to stretch said other of said constituent parts sufficiently to straighten said bight.
2. A webbing construction according to claim 1 in which said two stretchable webbing parts are of at least substantially the same stretchability.

References Cited by the Examiner
UNITED STATES PATENTS

| | | | |
|---|---|---|---|
| 841,157 | 1/1907 | Knothe | 2—338 |
| 1,082,486 | 12/1913 | Bosch | 2—221 X |
| 1,606,899 | 11/1926 | Rockwood | 112—414 |
| 2,458,264 | 1/1949 | Hart | 244—152 |

JORDAN FRANKLIN, *Primary Examiner.*
J. R. BOLER, *Assistant Examiner.*